United States Patent [19]
Goldsmith et al.

[11] Patent Number: 5,114,581
[45] Date of Patent: May 19, 1992

[54] BACK-FLUSHABLE FILTRATION DEVICE AND METHOD OF FORMING AND USING SAME

[75] Inventors: Robert L. Goldsmith, Belmont; Bruce A. Bishop, Cambridge, both of Mass.

[73] Assignee: CeraMem Corporation, Waltham, Mass.

[21] Appl. No.: 639,568

[22] Filed: Jan. 10, 1991

[51] Int. Cl.⁵ ............... B01D 61/00; B01D 29/00; B01D 24/00
[52] U.S. Cl. ................... 210/650; 210/653; 210/108; 210/321.75; 210/500.27; 210/506; 210/510.1; 55/16; 55/523; 264/60
[58] Field of Search ........... 210/650, 651, 653, 655, 210/500.21, 506, 108, 509, 500.29, 500.3, 500.27, 510.1, 490, 496, 321.75, 500.33, 638, 649, 494.1; 55/16, 274, 179, 523, 510.1, 321.75; 264/60

[56] References Cited

U.S. PATENT DOCUMENTS

| | | | |
|---|---|---|---|
| 4,329,162 | 5/1982 | Pitcher, Jr. | 210/510.1 |
| 4,364,760 | 12/1982 | Higuchi et al. | 210/510.1 |
| 4,416,675 | 11/1983 | Montierth | 210/510.1 |
| 4,416,676 | 11/1983 | Montierth | 210/510.1 |
| 4,417,908 | 11/1983 | Pitcher, Jr. | 210/510.1 |
| 4,419,108 | 12/1983 | Frost et al. | 210/510.1 |
| 4,428,758 | 1/1984 | Montierth | 210/510.1 |
| 4,464,185 | 8/1984 | Tomita et al. | 210/510.1 |
| 4,830,749 | 5/1989 | Okamoto et al. | 210/510.1 |
| 4,874,516 | 10/1989 | Kondo | 210/500.27 |
| 4,983,423 | 1/1991 | Goldsmith | 210/496 |

*Primary Examiner*—Robert A. Dawson
*Assistant Examiner*—Ana Furtuna
*Attorney, Agent, or Firm*—Richard P. Crowley

[57] ABSTRACT

A back-flushable filtration device is provided. The device includes a monolith of porous material having an inlet end and an outlet end. The passageways of the monolith are plugged at the inlet and outlet ends of the monolith, thereby preventing direct passage of feed stock through the passageways from the inlet end to the outlet end. A microporous membrane of mean pore size smaller than the mean pore size of the monolith material covers the surface of the passageways. Methods for making the back-flushable filter as well as methods for using the back-flushable filter also are provided.

21 Claims, 2 Drawing Sheets

5,114,581

BACK-FLUSHABLE FILTRATION DEVICE AND METHOD OF FORMING AND USING SAME

BACKGROUND OF THE INVENTION

The invention relates to a particulate surface filter, regenerable by back-flushing, formed from a porous honeycomb monolith structure with selectively plugged passageways and microporous membrane coatings applied to the passageway surfaces.

Diesel particulate filters for removal of soot from combustion sources have been commercially available for several years, since the early 1980's. These devices are fabricated from a porous honeycomb ceramic monolith which contains a multiplicity of longitudinal passageways extending through the monolith between a pair of opposing end faces where the open cross sections of the passageways are exposed. The passageways themselves are formed by thin, porous walls which extend continuously between the end faces. The passageway densities can range from below 25 passageways per square inch to over 1000 passageways per square inch of cross-sectional area of the monolith. This monolith structure represents a highly-compact, high surface area filter.

The diesel filter is typically formed from such a monolith structure by plugging alternate ends of adjacent passageways. In this structure, exhaust gas flow is introduced into open passageways at the inlet face of the structure. These passageways are plugged at the downstream end face, and thereby gas flow is forced to flow through the porous walls of the monolith structure. Carbon soot is collected on and within the walls of the monolith structure. The soot so collected is removed by intermittent regeneration which is accomplished by thermal oxidation.

Unless the trapped, particulate matter is removed by combustion, it would be extremely difficult to regenerate a diesel filter. For example, regeneration by back flushing, a method frequently used for filters which function as surface filters, will be highly ineffective because particulate matter will have entered and plugged the pore structure. Filter structures which function in this manner, so called depth filters, are generally single use disposable filters.

The mean pore size of the ceramic materials used for honeycomb monoliths suitable for diesel particulate filters can vary, and is typically in the range of from about 10 microns to 50 microns. The pore size distribution of such materials is generally quite broad. A relatively large pore size is chosen so that the devices have a low pressure drop at the desired gas flow rate per unit filter area. The walls of such diesel filters have a pore structure which is substantially homogeneous across its thickness, and therefore, for the wall thickness typically employed, a finer pore size cannot be employed without creating a pressure drop undesirable for diesel applications.

The pore size and pore size distribution in diesel filters are such that if used in typical surface filtration applications, particulate matter would enter and clog the pore structure. Backflushing to regenerate the filter would be ineffective due to such clogging of the pore structure.

SUMMARY OF THE INVENTION

It is therefore an object of the invention to provide a new filtration device which is regenerable by back flushing.

It is a further object of this invention to provide such a filter which has a large amount of surface area relative to the volume of the device.

A still further object of this invention is to provide a method for making such a filtration device This invention results from the realization that a back flushable filter can be fabricated from a large pore size monolith if the filtration surfaces of the monolith passageways are coated with a microporous membrane coating with a pore size sufficiently small such that particulate matter in the fluid to be filtered is removed on the surface of the membrane coating and is prevented from entering the pore structure of the monolith material. The device has wide utility for filtration of gases and liquids for removal of particulate matter of particle size from a few microns down to sub-micron size.

This invention features a filtration device for receiving a feed stock at an inlet end face and for separating the feed stock into filtrate and a filter cake. The filter is comprised of a monolith of porous material containing a plurality of passageways extending longitudinally from the inlet end face to an outlet end face of the monolith through which filtrate is discharged. A plurality of plugs in the ends of passageways at the inlet end face and the outlet end face of the monolith prevents direct passage of the feed stock through the passageways from the inlet end face to the outlet end face, and a microporous membrane of mean pore size smaller than the mean pore size of the monolith material is applied to the surfaces of the passageways.

In one embodiment, the monolith material is a porous ceramic, and may be selected from the group including cordierite, alumina, silica, mullite, zirconia, titania, spinel, silicon carbide, silicon nitride, and mixtures thereof.

In another embodiment, the membrane is a polymeric membrane, and may be selected from the group including cellulose, cellulose acetates, cellulose nitrate, polyethylene, polypropylene, nylons and other polyamides, polyesters, polycarbonates, polyvinylidene difluoride, polytetrafluoroethylene, polysulfones, polyethersulfones, polyacrylonitriles, and mixtures thereof.

In yet another embodiment the membrane is a ceramic membrane and may be selected from the group including alumina, zirconia, titania, silica, zircon, cordierite, mullite, spinel, silicon carbide, silicon nitride, and mixtures thereof, bonded by thermal sintering or with a reactive inorganic binder.

The pore size of the membrane preferably is in the range of from 0.1 micron to 5 microns, and the ratio of the mean pore size of the monolith material relative to that of the membrane may be in the range of 2 to 500, or more preferably 10 to 250.

In one embodiment the plugs are in alternate ends of adjacent passageways.

The initial retention efficiency of the filter may be greater than 99% for 5 micron particles, and preferably, greater than 99% for 0.5 micron particles.

The invention features a method of forming a filtration device from a monolith of porous material having a plurality of passageways extending longitudinally from an inlet end face to an outlet end face of the monolith, including plugging passageways at the outlet end face while leaving them unplugged at the inlet end face, thereby becoming inlet passageways, plugging other passageways at the inlet end face while leaving them unplugged at the outlet end face, thereby becoming outlet passageways, and applying a microporous membrane of pore size smaller than the pore size of the monolith to at least the surfaces of the walls of the inlet passageways.

The invention further features a method for filtering a feed stock. According to this method, feed stock is introduced into a monolith of porous material having a plurality of longitudinal passageways and having an inlet end and an outlet end. The monolith is constructed and arranged so that feed stock entering the inlet end must pass through a monolith wall separating longitudinal passageways in order to be discharged from the outlet end. The monolith wall, at least on the side in contact with the feed stock, is coated with a microporous membrane of mean pore size smaller than the mean pore size of the monolith material. A filter cake is formed on the microporous membrane during filtration, and flow then is reversed to remove the filter cake from the microporous membrane. Further, the filter cake removed may be collected.

DETAILED DESCRIPTION OF THE INVENTION

Figure 1:
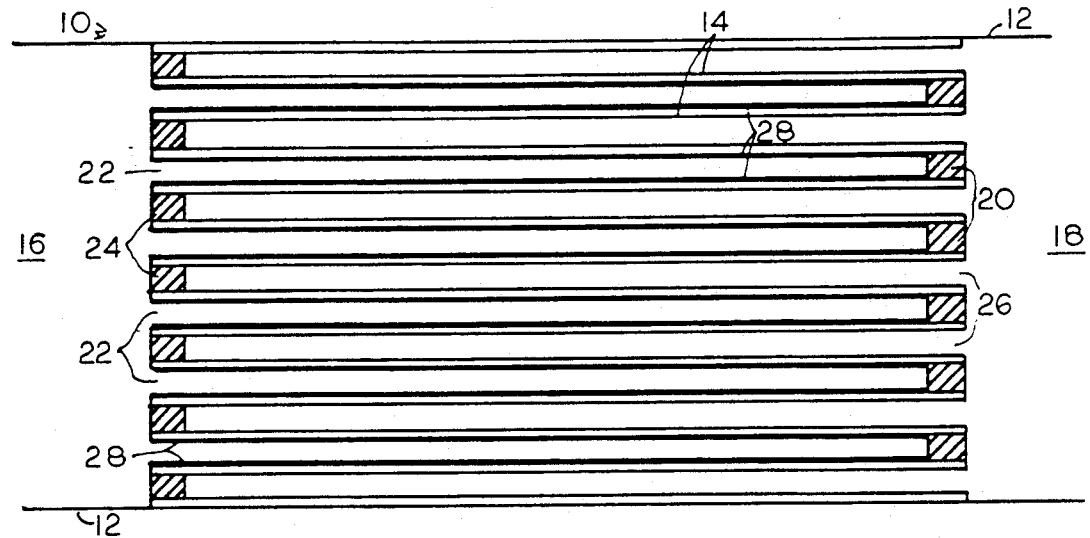
FIG. 1 shows a cross sectional view of a monolith filter structure along a plane parallel to an axis of the structure and perpendicular to the planes of the monolith end faces.

As shown in FIG. 1, the invention includes a monolith 10 in a housing 12. The monolith has porous, longitudinal walls 14 forming a plurality of longitudinal passageways extending from an inlet end face 16 of the monolith to an outlet end face 18 of the monolith. A filter body is formed from such a monolith by plugging alternate ends of adjacent passageways, thereby creating inlet and outlet passageways. Thus, plugs 20 block the outlet end of inlet passages 22 and plugs 24 block the inlet end of outlet passages 26. This construction prevents direct passage of a feed stock through the passageways from the inlet end face to the outlet end face of the monolith through which filtrate is discharged. Instead, feed stock entering an inlet passageway from the inlet end must pass through the porous monolith walls 14 separating the inlet and outlet passageways in order to be discharged.

A thin microporous membrane 28 is formed on at least the surfaces of the walls forming the inlet passageways. The pore size of the membrane is smaller than that of the monolith material, and preferably less than that of the size of the particulate matter to be removed by the filter.

Figure 2:
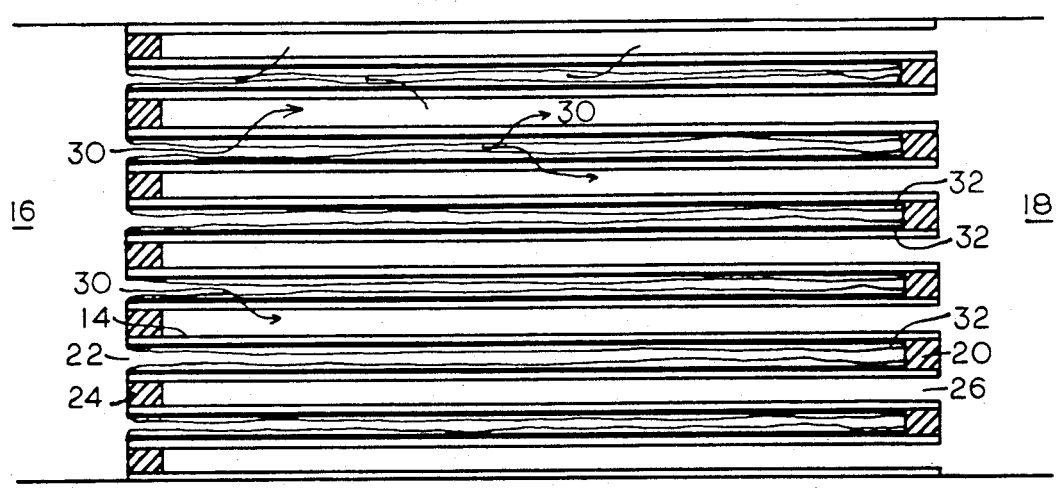
FIG. 2 shows the same cross-sectional view when the filter is operating as a filter.

As shown in FIG. 2, during filtration, flow (arrow 30) of a feed stock to be filtered is introduced into inlet passageways 22 and is forced to flow through the microporous membrane 28 and supporting monolith walls 14 separating inlet and outlet passageways. Particulate matter is retained on the surface of the membrane as a filter cake 32. Filtrate is removed at the outlet end face 18.

Figure 3:
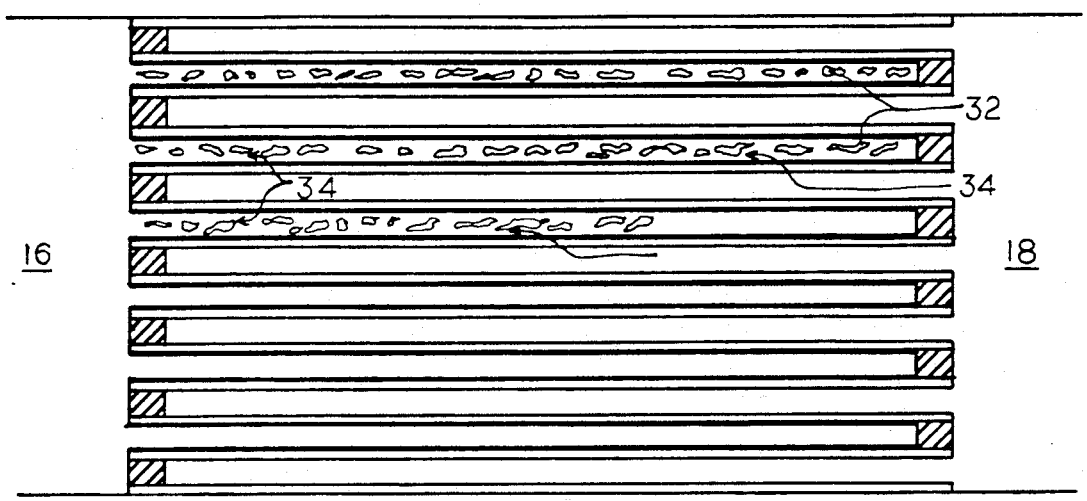
FIG. 3 shows the same cross-sectional view when the filter is undergoing regeneration by back flushing.

As shown in FIG. 3, the filter is regenerated by reversing flow (arrow 34), that is, back flushing from the outlet end face into the outlet passageways, through the monolith walls, 14 and into the inlet passageways. The filter cake 32 is detached from the surface of the membrane and is swept away in the back-flush fluid exiting from the inlet end face.

While a back flushable filter according to the invention may be plugged at alternate ends of adjacent passageways, as shown in FIG. 4, other plugging configurations are possible. For example, this includes asymmetric plugging configurations, such as shown in FIG. 5, in which passageways other than alternate passageways are plugged.

Figure 4A:
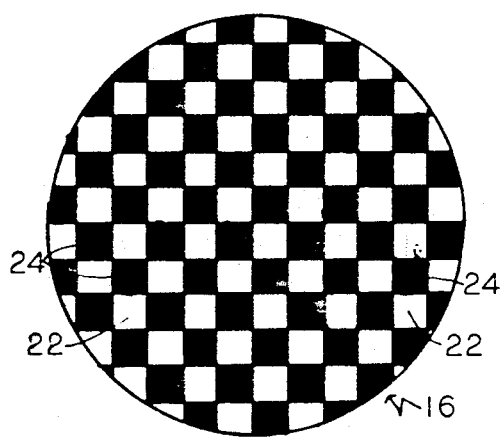
FIG. 4a and 4b shows end views of a back-flushable filter, detailing a first plugging configuration.
Figure 4B:
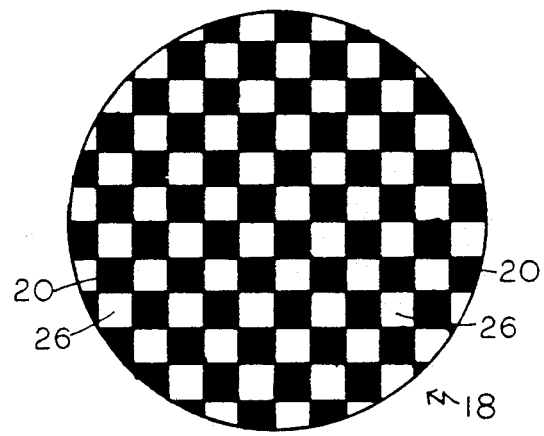

In FIG. 4a, at the inlet end face 16, alternate passageways are plugged as at 24 and become outlet passageways 26; unplugged passageways are the inlet passageways 22. At the outlet end face 18, shown in Fig. 4b, those passageways not plugged at the inlet end face are plugged as at 20, and passageways plugged at the inlet end face are left unplugged.

Figure 5A:
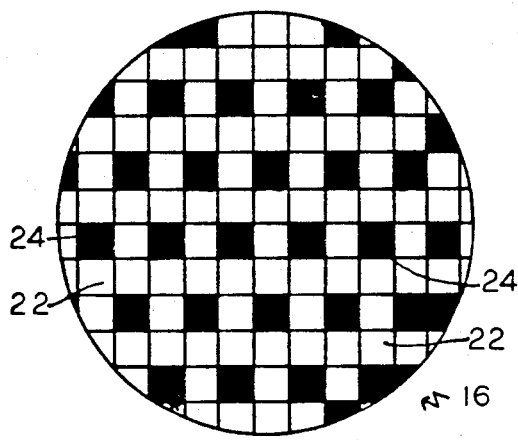
FIG. 5a and 5b shows end views of a back flushable filter, detailing a second plugging configuration.
Figure 5B:
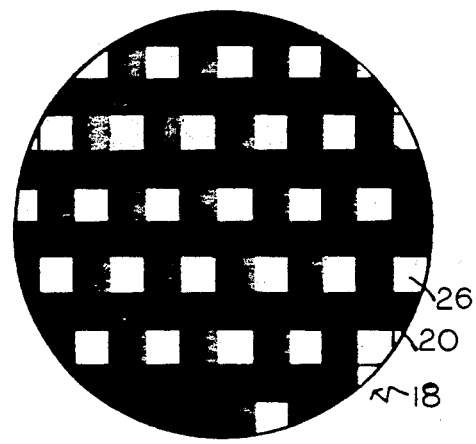

In FIG. 5a, a different plugging configuration is shown. At the inlet end face 16 in this configuration only 25% of the passageways are blocked by plugs 24. At the outlet end face 18, 75% of the passageways 23 are blocked by plugs 20. This configuration allows more filtration area for the incoming feed stock.

For each possible plugging configuration there is no passageway which remains open from the inlet end face to the outlet end face. That is, once a plurality of passageways is plugged at one end face of the monolith, all other passageways are to be plugged at the opposite end face. This plugging requirement prevents direct passage of the feed stock through a passageway from the inlet end face to the outlet end face.

A passageway could be plugged at both end faces, but it would be isolated from each end face and therefore be inactive for filtration. This isolation of specific passageways may be practiced for small passageways at the outer surface of the monolith, as is shown in FIGS. 4 and 5, to isolate passageways which are difficult to coat with the microporous membrane because of the reduced size of the passageways. The porous monolith can be formed from a variety of porous materials, including ceramics, glass bonded ceramics, glasses, sintered metals, cermets, resins or organic polymers, papers or textile fabrics, and various combinations thereof. Among ceramics are included cordierite, alumina, silica, mullite, zirconia, titania, spinel, silicon carbide, silicon nitride, and mixtures thereof. These ceramic materials may also be used in monoliths in which the ceramic materials are bonded with a glass.

In order to have a suitably high hydraulic permeability, the mean pore size of the monolith material preferably is greater than about 5 microns, and the porosity of the material preferably is greater than about 40 volume percent.

The plugs used to seal the alternate ends of the adjacent passageways can be polymeric or inorganic, and are normally selected to have good adhesion and chemical and thermal compatibility with the monolith material.

The membrane coating can be formed from a variety of materials, including polymeric materials and inorganic materials. Polymeric materials which can be used include cellulose, cellulose acetates, cellulose nitrate, polyethylene, polypropylene, nylons and other polyamides, polyesters, polycarbonates, polyvinylidene difluoride, polytetrafluoroethylene, polysulfones, polyethersulfones, polyacrylonitriles, and mixtures thereof. Inorganic materials which can be used include sintered metals and ceramic membranes. Ceramic membranes can include alumina, zirconia, titania, silica, zircon, cordierite, mullite, spinel, silicon carbide, silicon nitride, and mixtures thereof, bonded by thermal sintering or with a reactive inorganic binder as described in co-pending application Ser. No. 07/198,195, filed May. 24, 1988, and entitled "Porous Inorganic Membrane with Reactive Inorganic Binder, and Method of Forming Same", the entire disclosure of which is incorporated herein by reference.

Mean pore size of the membrane coating is preferably in the range of from 0.1 micron to 5 microns. The thickness of the membrane coating should be as thin as possible so as to minimize the hydraulic resistance of the membrane coating, and preferably is less than 100 microns.

The membrane coating may be applied only to the inlet passageways, or alternately, it may be applied to both inlet and outlet passageways. If applied to both sets of passageways, the clean filter resistance to flow is increased. However, a membrane coating on the outlet passageways prevents possible plugging of the monolith material by particulate matter which may be present in the back flushing fluid. It also permits the device to be used as a back flushable filter with flow moving in either direction. Also, the membrane coating is more readily applied to the passageways before plugging the ends of the passageways.

The membrane coating may be applied by various techniques, including viscous coating, filtration, and slip casting. Viscous coating is useful for coating of polymeric membranes. Filtration and slip casting may be used to apply coatings of ceramic or metal powders, which are subsequently stabilized and made strongly coherent and adherent to the passageway walls by thermal sintering, chemical reaction bonding, or other bonding techniques.

It is important that the membrane be a true membrane, and not a partial coating. Thus, by membrane it is meant that a continuous coating be formed over the monolith surfaces such that access to the pores in the monolith is only via the membrane. Most preferably, the membrane covers the surface of the monolith but does not enter the pores of the monolith to any substantial degree. This is believed to be accomplished using the coating materials and methods described in greater detail in the Examples below.

The filter may be used to filter either a gaseous or liquid feed stock. In either instance, the clean filter flow resistance is to be minimized. This is achieved by proper selection of a monolith material with sufficiently large pore size and porosity so that the monolith material has a high hydraulic permeability. The resistance of the membrane coating is kept small by controlling membrane pore size, porosity, and thickness. The preferred membrane pore size is greater than about 0.1 micron and less than 5 microns; the preferred porosity is greater than 40 volume percent; and the preferred membrane coating thickness is less than 100 microns. The ratio of the mean pore size of the monolith material relative to that of the membrane coating is generally in the range of 2 to 500, and preferably in the range of from 10 to 250. The ratio of the thickness of the passageway walls of the monolith to the membrane coating is generally in the range of 2 to 100, and preferably in the range of 5 to 50.

The filter is regenerated by back-flushing with a fluid normally free of particulate matter. In many instances, the fluid used for back-flushing can be filtrate produced from the feed stock.

The following examples provide a comparison of permeability and separation efficiency for a monolith filter without a membrane coating and a monolith filter with a membrane coating according to this invention.

EXAMPLE 1

A six inch long cordierite monolith with a square cross section about 0.75 inches on a side was cut from a larger monolith sample obtained from Corning Inc. (Corning, New York). The monolith material was EX66 which has a 50% porosity and a 35 micron mean pore size. The passageway configuration was 100 square passageways per square inch, uniformly spaced. The passageway side dimension was about 0.075 inch and the wall thickness was about 0.025 inch. The monolith, as cut, had 49 parallel passageways, 7 on a side.

Polyvinylchloride end rings were glued onto each end of the monolith as sealing surfaces. A silicone adhesive, RTV41 (General Electric Company, Waterford, NY) was used. After gluing on the end rings, only 25 passageways were available to be used. These remaining passageways were plugged to make a dead ended filter. A total of twelve alternate passageways on the inlet face of the device were plugged with the silicone adhesive. Passageways which were open on the inlet face (a total of thirteen) were plugged at the outlet face. Fluid to be filtered was thereby constrained to flow through the porous passageway walls. There was about 0.16 square feet of wall passageway area for fluid filtration.

The dead ended filter was tested for pressure drop at a fixed nitrogen gas flow. A pressure drop of 0.5 inches of water was measured at room temperature and 2.5 feet per minute face velocity through the filter.

After this gas flow test, the initial retention efficiency of 5 micron alumina (Norton Company, Code 7921) suspended in water was measured by determining the turbidity of the feed stock and the initial filtrate (approximately first 50 cc of filtrate) in a filtration test. The test was conducted at room temperature and a feed stock flow of about 500 cc/min. The initial retention efficiency was 17% for a feed suspension with a turbidity of about 1000 NTU.

EXAMPLE 2

A cordierite monolith identical to that in EXAMPLE 1 was coated on all passageways with a ceramic membrane by slip casting generally in accordance with the methods taught in U.S. Pat. application Ser. No. 07/198,195. The membrane composition in weight percent as fired was 75% TAM zircon milled fine (TAM Ceramics Inc., Niagra Falls, NY) and 25% glass frit P941 (Pemco Products, Industrial Chemicals Division, Baltimore, MD). The membrane thickness was measured by scanning electron microscopy to be about 50 microns and the membrane porosity was estimated to be about 40-50 vol. %. The ratio of monolith wall thickness to membrane thickness was about 13.

End rings were glued on the specimen and its passageways were plugged identically to the specimen of EXAMPLE 1.

The dead-ended filter with the membrane coating was tested for pressure drop at a fixed nitrogen gas flow. A pressure drop of 4 inches of water was measured at room temperature and 2.5 feet per minute face velocity through the filter.

After this test, the initial retention efficiency of 5 micron and finer alumina particles (Norton Company, Code 7920) suspended in water was measured as before. For feed stocks with approximately 1000 NTU, the initial retention efficiency was 99.8% for 5 micron alumina, 99.7% for 3 micron alumina, and 99.4% for 0.5 micron alumina. The filter was regenerated between tests by thoroughly back flushing with water.

Another test was performed with an aqueous dispersion of a monodisperse polystyrene latex of particle size in the range of 0.35 to 0.55 micron (Dow Chemical Company, Midland, MI, type DL247A). Latex initial retention efficiency for a feed stock with about 1300 NTU was 25.2%.

Based on these retention data, the membrane mean pore size was estimated to be about 0.2 to 0.5 micron. The ratio of mean pore size of the monolith material to that of the membrane coating was estimated to be about 70 to 175.

Another test was conducted for the filtration of flour suspended in air. In this test flour was dispersed in air and aspirated by a vacuum through the filter. The filter was backflushed by reversing flow through the filter and the test was repeated for several cycles. During the filtration cycles the filtrate was visibly free of dust. No apparent blockage or plugging of the filter was observed over the filtration and regeneration cycles.

Although specific features of the invention are shown in some drawings and not others, this for convenience only as each feature may be combined with any or all of the other features in accordance with the invention.

Other embodiments will occur to those skilled in the art and are within the following claims:

What is claimed is:

1. In a filtration device for separating a particulate-containing feed stock into a filtrate and a particulate-containing filter cake, which filtration device comprises a monolith of porouos material containing a plurality of passageways extending longitudinally from an inlet end face to an outlet end face and having a plurality of plugs in the ends of the passageways at the inlet end face and at the outlet end face to prevent direct passage of the feed stock through the passageways from the inlet end face to the outlet end face, the improvement which comprises:

a microporous membrane selected to separate the feed stock into a filtrate and a particulate-containing filter cake, the membrane applied to at least the wallsurfaces of the passageways open at the inlet end face and of mean pore size smaller than the mean pore size of the porous material of the monolith, the membrane substantially preventing the entrance of the particulate of the feed stock into the pores of the porous material, and the filtration device regenerable by withdrawal of the filter cake from the inlet end face of the filtration device.

2. The filtration device of claim 1, in which the monolith material is a porous ceramic.

3. The filtration device of claim 1, in which the membrane is a polymeric membrane.

4. The filtration device of claim 1, in which the membrane is a ceramic membrane.

5. The filtration device of claim 1, in which in which mean pore size of the membrane coating is in the range of from 0.1 micron to 5 microns.

6. The filtration device of claim 1, in which the ratio of the mean pore size of the monolith material relative to that of the membrane coating is in the range of 2 to 500.

7. The filtration device of claim 1, in which the ratio of the mean pore size of the monolith material relative to that of the membrane coating is in the range of 10 to 250.

8. The filtration device of claim 1, in which the plugs are in alternate ends of adjacent passageways.

9. The filtration device of claim 1, in which the initial retention efficiency of the device for 5 micron particles is greater than 99%.

10. The filtration device of claim 1, in which the initial retention efficiency of the device for 0.5 micron particles is greater than 99.

11. In a filtration device for separating a particulate-containing feed stock into a filtrate and particulate-containing filter cake, which filtration device comprises a monolith of porous ceramic material containing a plurality of passageways extending longitudinally from an inlet end face to an outlet end face and having a plurality of plugs in the ends of the passageways at the inlet end face and at the outlet end face to prevent direct passage of the feed stock through the passageways from the inlet end face to the outlet end face, the improvement which comprises:

a microporous ceramic membrane selected to separate the feed stock into a filtrate and a particulate-containing filter cake, the membrane applied at the thickness of about 100 microns or less to at least the wall surfaces of the passageways open at the inlet end face and of mean pore size of about 0.1 to 5 microns and smaller than the mean pore size of the porous material of the monolith and with a ratio of mean pore size of the porous material to the mean pore size of the membrane of 2 to 500, the membrane substantially preventing the entrance of the particulate of the feed stock into the pores of the porous material, and the filtration device regenerable by withdrawal of the filter cake from the inlet end face of the filtration device.

12. In a method for forming a filtration device for separating a particulate-containing feed stock into a filtrate and a particulate-containing filter cake, which method comprises: providing a monolith of porous material containing a plurality of passageways extending longitudinally from an inlet end face to an outlet end face and having a plurality of plugs in the ends of the passageways at the inlet end face and the outlet end face to prevent direct passage of the feed stock through the passageways from the inlet end face to the outlet end face, the improvement which comprises:

applying a microporous membrane selected to separate the feed stock into a filtrate and a particulate-containing filter cake, the membrane applied to at least the wall surfaces of the passageways open at the inlet end face, and of mean pore size smaller that the mean pore size of the porous material of the monolith, the membrane substantially preventing the entrance of the particulate of the feed stock into the pores of the porous material, and the filtration device regenerable by withdrawal of the filter cake from the inlet end face of the filtration device.

13. The method of claim 12 which includes providing a porous ceramic monolith material and applying a microporous ceramic membrane.

14. The method of claim 12 wherein the ratio of the mean pore size of the monolith material to the mean pore size of the microporous membrane is in the range of about 10 to 250.

15. The method of claim 12 wherein the microporous membrane pore size is about 0.1 to 5.0 microns, and the thickness of the microporous membrane is less than about 100 microns.

16. The filtration device produced by the method of claim 12.

17. In a method for separating a particulate-containing feed stock into a filtrate and a particulate-containing filter cake which method comprises providing a monolith of porous material containing a plurality of passageways extending longitudinally from an inlet end face to an outlet end face and having a plurality of plugs in the ends of the passageways at the inlet end face and the outlet end face to prevent direct passage of the feed stock through the passageways from the inlet end face to the outlet end face, the improvement which comprises:

a) providing a microporous membrane selected to separate the feed stock into a filtrate and a particulate-containing filter cake, the membrane applied to at least the wall surfaces of the passageways open at the inlet end face and of mean pore size smaller than the mean pore size of the porous material of the monolith, the membrane substantially preventing the entrance of the particulate of the feed stock into the pores of the porous material;

b) introducing the feed stock into the inlet end face of the monolith and into a plurality of passageways open at the inlet end face containing the membrane;

c) withdrawing the filtrate from the outlet end face which filtrate passes through the membrane coated monolith walls separating the passageways open at the inlet end face through the passageways open at the outlet end face;

d) forming a filter cake of particulate-containing material from the feed stock on the membrane applied to the wall surfaces of the passageway open at the inlet face; and e) regenerating the filtration device by withdrawal of the filter cake from the inlet end face of the filtration device.

18. The method of claim 17 which includes regenerating the filtration device by back flushing the filtration device with a fluid.

19. The method of claim 17 which includes introducing the feed stock into a monolith of porous ceramic material microporous ceramic membrane with a mean pore size of about 0.1 to 5 microns applied to at least the wall surfaces of the passageways open at the inlet and face.

20. The method of claim 17 which includes regenerating the filtration device by back flushing with the filtrate produced from the feed stock.

21. The method of claim 17 wherein the feed stock comprises a gaseous feed stock containing solid particulate material suspended therein and regenerating the filtration device by back flushing the filtration device with a fluid.

* * * * *

UNITED STATES PATENT AND TRADEMARK OFFICE
CERTIFICATE OF CORRECTION

PATENT NO. : 5,114,581
DATED : May 19, 1992
INVENTOR(S) : Goldsmith et al

It is certified that error appears in the above-identified patent and that said Letters Patent is hereby corrected as shown below:

In the claims, column 8, line 21, delete "99" and insert --99%--.

Signed and Sealed this

First Day of February, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,114,581
DATED : May 19, 1992
INVENTOR(S) : Robert L. Goldsmith et al It is certified that error appears in the above-identified patent and that said Letters Patent is hereby corrected as shown below:

Column 7, line 46 (Claim 1), delete "porouos" and insert --porous--.

Column 7, line 57 (Claim 1), insert a space between "wall" and "surfaces" in "wallsurfaces".

Column 8, line 64 (Claim 12), delete "that" and insert --than--.

Signed and Sealed this

Eleventh Day of October, 1994

Attest:

BRUCE LEHMAN

Attesting Officer

Commissioner of Patents and Trademarks